(12) United States Patent
Padban

(10) Patent No.: US 8,758,484 B2
(45) Date of Patent: Jun. 24, 2014

(54) REMOVAL OF CARBON DIOXIDE FROM FLUE GAS WITH AMMONIA COMPRISING MEDIUM

(75) Inventor: Nader Padban, Vällingby (SE)

(73) Assignee: ALSTOM Technology Ltd, Baden (CH)

( * ) Notice: Subject to any disclaimer, the term of this patent is extended or adjusted under 35 U.S.C. 154(b) by 40 days.

(21) Appl. No.: 12/663,911

(22) PCT Filed: Jun. 25, 2008

(86) PCT No.: PCT/EP2008/058085
§ 371 (c)(1),
(2), (4) Date: Dec. 10, 2009

(87) PCT Pub. No.: WO2009/003891
PCT Pub. Date: Jan. 8, 2009

(65) Prior Publication Data
US 2010/0170397 A1    Jul. 8, 2010

(30) Foreign Application Priority Data
Jul. 3, 2007   (EP) .................................. 07111609

(51) Int. Cl.
*B01D 53/14*   (2006.01)
(52) U.S. Cl.
USPC .............................. 95/183; 95/236
(58) Field of Classification Search
USPC .................. 95/183, 236, 228, 202, 156, 186; 96/234, 242, 243
See application file for complete search history.

(56) References Cited

U.S. PATENT DOCUMENTS

| | | | |
|---|---|---|---|
| 2,043,263 A * | 6/1936 | Porter | 423/246 |
| 3,808,325 A * | 4/1974 | Urban | 423/243.02 |
| 4,847,057 A * | 7/1989 | Brugerolle et al. | 423/234 |
| 4,848,057 A | 11/1989 | Berugerolle | |
| 7,255,842 B1 | 8/2007 | Yeh et al. | |
| 7,641,717 B2 * | 1/2010 | Gal | 95/187 |
| 2010/0003177 A1 * | 1/2010 | Aroonwilas et al. | 423/229 |

FOREIGN PATENT DOCUMENTS

| | | |
|---|---|---|
| DE | 3202059 | 4/1983 |
| JP | 57397/99 | 3/1999 |

(Continued)

OTHER PUBLICATIONS

PCT International Search Report and Written Opinion of the International Searching Authority dated Jul. 10, 2008 (PCT/EP2008/058085).

(Continued)

*Primary Examiner* — Duane Smith
*Assistant Examiner* — Pankti Patel
(74) *Attorney, Agent, or Firm* — Cynthia W. Flanigan

(57) ABSTRACT

A process of removal of $CO_2$ from a flue gas (2). The process comprises the steps of: a) providing a flue gas comprising $CO_2$ (2), b) contacting the flue gas of step (a) with an ammonia-comprising medium (9), to absorb $CO_2$ from said flue gas; and c) condensing ammonia (4) present in the flue gas leaving step (b), to remove ammonia from said flue gas. A system for removal of $CO_2$ from a flue gas. A system for removal of $CO_2$ from a flue gas. The system comprises a $CO_2$ absorber (1) receiving the flue gas (2) and comprising an ammonia-comprising medium (9). The system further comprises an ammonia condenser (4) receiving flue gas (3) leaving the $CO_2$ absorber.

15 Claims, 2 Drawing Sheets

(56) References Cited

FOREIGN PATENT DOCUMENTS

| SU | 1567251 | 5/1990 | | |
| SU | 1745314 | 7/1992 | | |
| WO | WO2006/022885 | 3/2006 | | |
| WO | WO 2006/022885 A1 * | 3/2006 | ............. | B01D 53/14 |
| WO | WO 2008/022885 * | 1/2008 | ............. | B01D 53/14 |

OTHER PUBLICATIONS

Yeh et al: "Semi-batch absorption and regeneration studies for CO2 capture by aqueous ammonia" Fuel Processing Technology, vol. 86, No. 14-15, Oct. 2005 (Oct. 1, 2005) pp. 1533-1546, XP005000683.
Official Decision of Grant received from the Patent Office of the Russian Federation, dated Sep. 19, 2012.

* cited by examiner

REMOVAL OF CARBON DIOXIDE FROM FLUE GAS WITH AMMONIA COMPRISING MEDIUM

TECHNICAL FIELD

The present invention relates to a process of removal of $CO_2$ from a flue gas and to a system for removal of $CO_2$ from a flue gas. In said process and by said system, $CO_2$ is removed by absorption in an ammonia-comprising medium.

BACKGROUND ART

Environmental concern raises a demand for removal of carbon dioxide ($CO_2$) from, e.g., combustion gases, and subsequent processing or storage of the $CO_2$, to reduce emission to the atmosphere thereof. In known technologies for ammonia or ammonium based $CO_2$ capture, $CO_2$ is converted to ammonium carbonate or ammonium bicarbonate in dissolved or solid form. It is known to regenerate the ammonia or ammonium compounds used for $CO_2$ capture by release of $CO_2$ under controlled conditions.

Resnik, K. P. et al. (2004) Aqua ammonia process for simultaneous removal of $CO_2$, $SO_2$ and $NO_x$, *Int. J. Environmental Technology and Management*, Vol. 4, Nos. 1/2, pp. 89-104, discloses that the aqueous ammonia process can remove $CO_2$ and other contaminants that may exist in flue gas. Test results pertaining to the ammonia/carbon dioxide reaction in a semi-continuous reactor system are presented. Regeneration test results, including solution-cycling between the regeneration and absorption steps, are also presented.

WO 2006/022885 discloses cleaning of combustion gas to near zero concentration of residual contaminants followed by the capture of $CO_2$. The $CO_2$ is captured from cooled and clean flue gas in a $CO_2$ absorber utilizing an ammoniated solution or slurry in the $NH_3$—$CO_2$—$H_2O$ system. Regeneration is accomplished by elevating the pressure and temperature of the $CO_2$-rich solution from the absorber.

It is, however, an ever existing desire to further improve $CO_2$ capture technologies in respect of, e.g., ammonia loss, power consumption, or chemical reaction rate.

SUMMARY OF THE INVENTION

An object of the present invention is to improve known ammonia or ammonium based technologies for $CO_2$ capture.

Accordingly, and depending on the operational and design parameters of a known technology for $CO_2$ capture, an object may reside in the reduction of energy and/or chemical consumption as well as in the reduction of investment and/or operation cost.

Additionally, an object may reside in the environmental, health and/or economical improvements of reduced emission of chemicals used in such a technology for $CO_2$ capture, e.g. in reduced ammonia slip.

In one aspect of the invention, the above-mentioned objects as well as further objects, which will become apparent to a skilled man after studying the description below, will be achieved by a process of removal of $CO_2$ from a flue gas, comprising the steps of: (a) providing a flue gas comprising $CO_2$; (b) contacting the flue gas of step (a) with an ammonia-comprising medium, to absorb $CO_2$ from said flue gas; and (c) condensing ammonia present in the flue gas leaving step (b), to remove ammonia from said flue gas.

In another aspect of the invention, said objects will be achieved by a system for removal of $CO_2$ from a flue gas, comprising a $CO_2$ absorber comprising an ammonia-comprising medium, to absorb $CO_2$ from said flue gas; and an ammonia condenser receiving the flue gas leaving the $CO_2$ absorber, to remove ammonia from said flue gas.

Thus, by condensation of ammonia present in the flue gas after absorption of $CO_2$ in an ammonia-comprising medium it is achieved an improved technology for $CO_2$ capture.

A flue gas may typically result from combustion of organic material such as renewable or non-renewable fuels. However, in the present context the term "flue gas" may refer to any gas mixture comprising $CO_2$. Should a flue gas to be treated according to the present invention comprise chemical species or particles detrimental to the absorption of $CO_2$ in an ammonia-comprising medium, or to other features of the present invention, such species or particles may be initially removed by separation technologies known to a skilled man. Examples of such pre-treatments are given in, e.g., WO 2006/022885 referred to above.

As used herein, ammonia-comprising medium is any medium used to absorb $CO_2$, which includes ammonia, ammonium, or any compounds or mixtures comprising ammonia or ammonium. As an example, the $CO_2$ absorption may take place in an aqueous medium where the ammonia can be in the form of ammonium ion, $NH_4^+$, or in the form of dissolved molecular $NH_3$. Contacting of the flue gas comprising $CO_2$ with an ammonia-comprising medium results in formation of ammonium carbonate or ammonium bicarbonate in dissolved or solid form. In other words, as often used in the art, $CO_2$ is absorbed by the ammonia-comprising medium and thus removed from the flue gas. The ammonia-comprising medium of the present invention may be prepared by dissolution or mixing of ammonia or an ammonium compound such as ammonium carbonate in water. The term "medium" refers to a solution as well as to a suspension or slurry.

Ammonia present in the $CO_2$ depleted flue gas after $CO_2$ absorption, e.g. ammonia carried over from the ammonia-comprising medium, may be removed from the flue gas by condensation. Such condensation may take place in a condenser or scrubber, e.g. by acid or water wash, or by other direct contact or indirect contact heat exchange. Condensation can be performed at temperatures close to 0° C., such as 0 to 5° C., and at pressures up to 50 bar, such as 0 to 10 bar.

Step (b) of the inventive process or the $CO_2$ absorber of the inventive system operates within a wide temperature range. Practically, the lower temperature limit is set by the freezing point of the ammonia-comprising medium. On the other hand, the upper temperature limit is for practical reasons set by the boiling point of the ammonia-comprising medium. It is to be understood that the references to freezing point and boiling point are made at the operating pressure of step (b) or the $CO_2$ absorber. At pressures close to atmospheric pressure, the upper and lower temperature limits may be close to 0 and 100° C., respectively, whereas temperatures above 100° C. may well be practical and preferred at higher pressures. A pressure range of 0 to 10 bar, preferably 5 to 10 bar, is contemplated. A higher pressure in the absorber increases both the solubility of the carbon dioxide in the medium and the residence time of the flue gas in the absorber, resulting in a smaller absorber size. A higher pressure also decreases the partial pressure of ammonia.

However, to achieve favourable mass transfer and chemical reaction rate, it may be desirable to operate at a temperature higher than the lower limit. Accordingly it is suggested to operate step (b) or the $CO_2$ absorber at a temperature higher than 20° C., preferably higher than 38° C., more preferably higher than 40° C., most preferably higher than 50° C.

To reduce loss of ammonia (due to evaporation) and/or energy (in the form of evaporating steam), it may be desirable to operate at a temperature lower than the upper limit. Accordingly it is suggested to operate step (b) or the $CO_2$ absorber at a temperature lower than 80° C., preferably lower than 60° C. In some applications, e.g. when the flue gas provided is of very low temperature, it is suggested to operate step (b) or the $CO_2$ absorber at a temperature lower than 16° C., preferably lower than 15° C., more preferably lower than 5° C.

A temperature range of 20 to 35° C. is contemplated for operation of step (b) or the $CO_2$ absorber.

Step (c) of the inventive process or the ammonia condenser of the inventive system may operate by indirect cooling of the gas leaving step (b) or the gas leaving the $CO_2$ absorber, respectively. In indirect cooling, the cooling medium is physically separated from the gas to be cooled. Thus, condensed ammonia will not be diluted by cooling medium but only with any component, e.g. water, present in the flue gas and condensed together with said ammonia. A low temperature enhances the solubility of the ammonia in the condensed water. Such an arrangement favourably allows for recovery of condensed ammonia at a higher concentration than should it additionally have been diluted with cooling medium. Further utilisation of the recovered ammonia is thus facilitated.

Ammonia condensed in step (c) of the inventive process or the ammonia condenser of the inventive system may be returned to step (b) or the $CO_2$ absorber, respectively. Thus, the need for make-up ammonia or ammonium as well as the amount of ammonia emitted to the environment is reduced.

The inventive process may comprise the further step (d) of releasing $CO_2$ from the medium resulting from step (b), to regenerate the ammonia-comprising medium. Correspondingly, the inventive system may further comprise a medium regenerator, to release $CO_2$ from the medium resulting from the $CO_2$ absorber. Released $CO_2$ may optionally be further processed or stored as suitable in view of technical, economical or environmental concerns.

Step (d) of the inventive process or the medium regenerator of the inventive system operates within a wide temperature range. It is desirable to operate at a temperature in the range of 100 to 200° C., preferably 110 to 160° C. Thus, the release of $CO_2$ is performed at a temperature allowing efficient release of $CO_2$.

Step (d) of the inventive process or the medium regenerator of the inventive system operates within a wide pressure range. It is desirable to operate at a pressure higher than atmospheric pressure, preferably higher than 10 bar. Due to the high regeneration pressure, the ammonia formed during regeneration is captured in the medium from which $CO_2$ is released. Thus, release, or loss, of ammonia is avoided.

The inventive process may comprise the further step (e) of returning the ammonia-comprising medium regenerated in step (d) to step (b). Correspondingly, the inventive system may further comprise a passage from the medium regenerator to the $CO_2$ absorber, to return regenerated ammonia-comprising medium to the $CO_2$ absorber. Thus, it has been created an integrated process or system allowing for continuous or semi-continuous removal of $CO_2$ from a flue gas by absorption in an ammonia-comprising medium, recovery of $CO_2$, and regeneration and recycling of said medium. Ammonia emission from, and ammonia make-up to, the integrated process or system is reduced.

DETAILED DESCRIPTION OF EMBODIMENTS

Figure 1A:
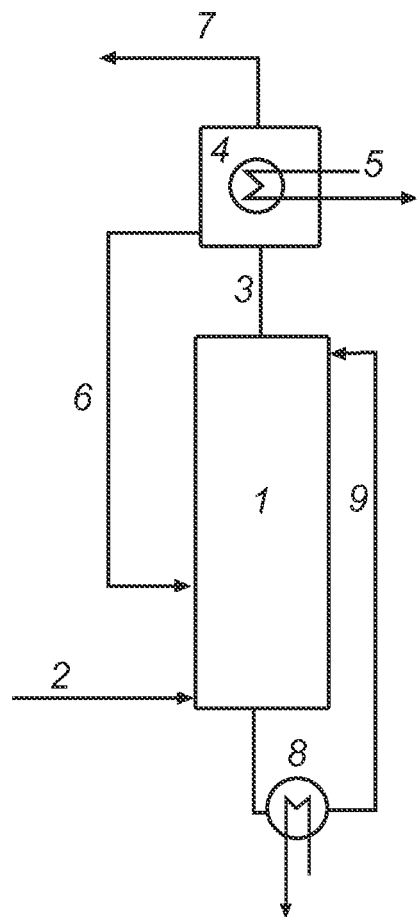
FIGS. 1a and 1b are schematic representations of an ammonium based $CO_2$ capture system.
Figure 1B:
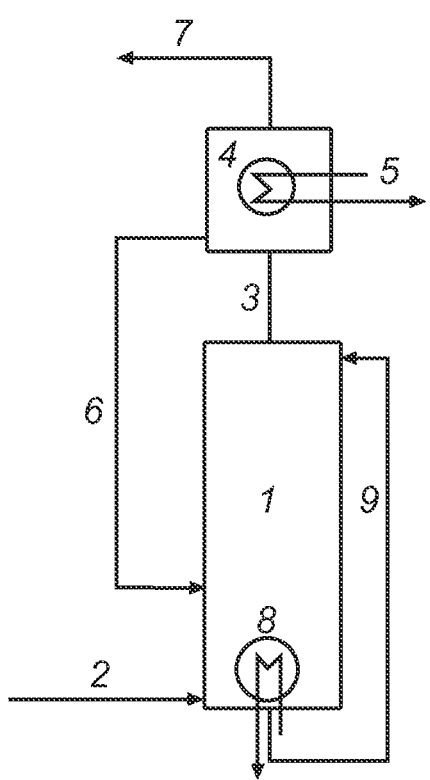

FIGS. 1a and 1b are schematic representations of an ammonium based $CO_2$ capture system. The system comprises a $CO_2$ absorber 1. In all embodiments, $CO_2$ absorber 1 may be arranged as a plurality of vessels or operational steps in parallel or in series. Flue gas 2, from which $CO_2$ is to be removed, is fed to $CO_2$ absorber 1. In $CO_2$ absorber 1 the flue gas is contacted with ammonia-comprising medium, e.g. by bubbling the flue gas through said medium or by spraying the medium into the flue gas. It is within the knowledge of a skilled man to arrange for contacting of flue gas with ammonia-comprising medium. In $CO_2$ absorber 1, $CO_2$ from flue gas 2 is absorbed in the ammonia-comprising medium, e.g. by formation of carbonate or bicarbonate of ammonium either in dissolved or solid form. Flue gas depleted of $CO_2$ leaves $CO_2$ absorber 1 via line 3. As used herein, ammonia-comprising medium is any medium used to absorb $CO_2$, which includes ammonia, ammonium, or any compounds or mixtures comprising ammonia or ammonium. As an example, the $CO_2$ absorption may take place in an aqueous medium where the ammonia can be in the form of ammonium ion, $NH_4^+$, or in the form of dissolved molecular $NH_3$.

The system illustrated in FIGS. 1a and 1b further comprises an ammonia condenser 4. In all embodiments, ammonia condenser 4 may be arranged as a plurality of vessels or operational steps in parallel or in series. Ammonia condenser 4 is an indirect cooler having a cooling medium circulation 5. Via line 3, flue gas from $CO_2$ absorber 1 enters ammonia condenser 4. In ammonia condenser 4, ammonia present in the flue gas is condensed, e.g. on the heat exchange surfaces separating cooling medium of cooling medium circulation 5 and flue gas to be treated. Condensed ammonia, typically dissolved in water which may also have condensed from water vapour present in flue gas, leaves ammonia condenser 4 via line 6 and is returned to $CO_2$ absorber 1. Flue gas depleted of ammonia leaves ammonia condenser 4 via line 7.

The operating temperature of $CO_2$ absorber 1 is controlled by passing ammonia-comprising medium through a heat exchanger 8 and returning the medium to $CO_2$ absorber 1 via line 9. Heat exchanger 8 may, as desirable, heat or cool said medium. Heat exchanger 8 may be arranged on line 9, as illustrated in FIG. 1a, or in a vessel comprising $CO_2$ absorber 1, as illustrated in FIG. 1b.

Figure 2:
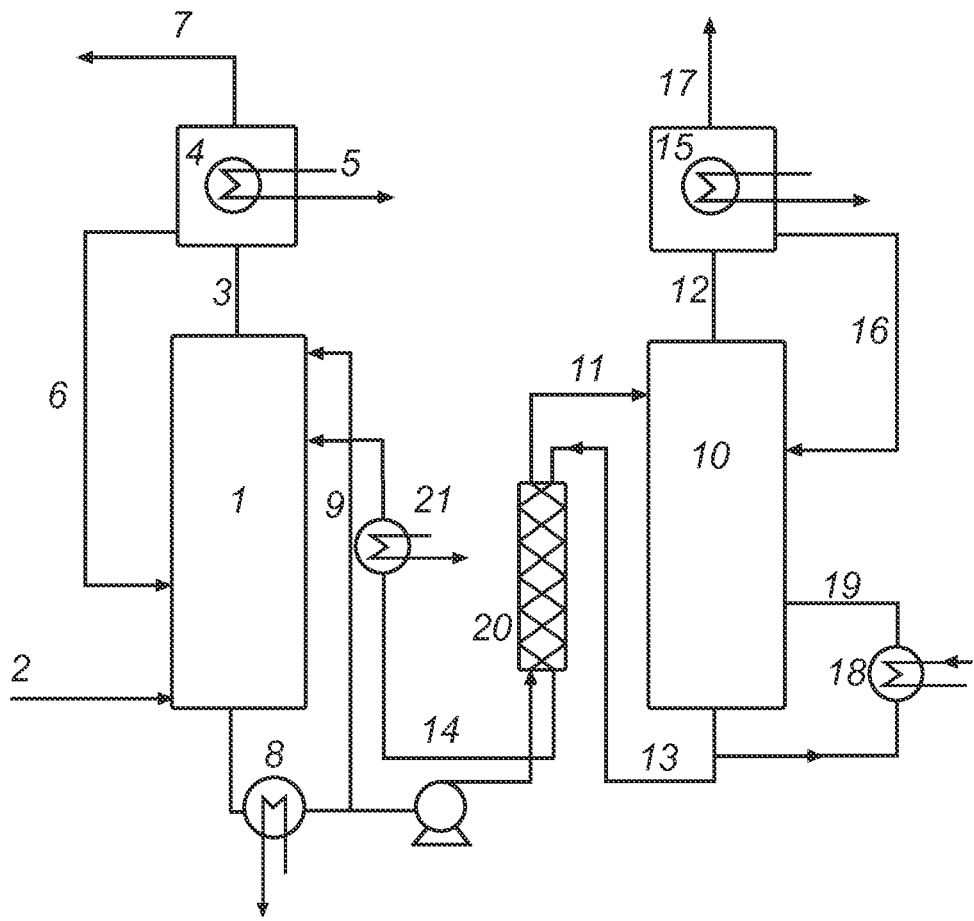
FIG. 2 is a schematic representation of an ammonium based $CO_2$ capture system.

FIG. 2 is a schematic representation of an ammonium based $CO_2$ capture system. The system comprises a $CO_2$ absorber, an ammonia condenser, a heat exchanger and related piping as described and numbered above. In FIG. 2, heat exchanger 8 is shown as in FIG. 1a but the alternate arrangement of FIG. 1b is also feasible.

The system illustrated in FIG. 2 further comprises a regenerator 10. In all embodiments, regenerator 10 may be arranged as a plurality of vessels or operational steps in parallel or in series. Ammonia-comprising medium, including dissolved or solid carbonate or bicarbonate of ammonium as formed in $CO_2$ absorber 1, enters regenerator 10 via line 11. In regenerator 10 the medium is exposed to temperature and pressure conditions sufficient to release $CO_2$ from the medium and to regenerate ammonia-comprising medium. Basically, carbonate or bicarbonate of ammonium either in dissolved or solid form is decomposed to release $CO_2$ as a gas. It is within the knowledge of a skilled man to obtain such conditions, e.g. utilising heat exchangers and pumps.

Released $CO_2$ leaves regenerator 10 via line 12. Regenerated ammonia-comprising medium is returned to $CO_2$ absorber 1 via lines 13 and 14.

The system illustrated in FIG. 2 further comprises an ammonia recovery condenser 15, the purpose of which is to recover ammonia leaving regenerator 10 with released $CO_2$. In all embodiments, ammonia recovery condenser 15 may be arranged as a plurality of vessels or operational steps in parallel or in series. Ammonia recovery condenser 15 may be designed as described above for ammonia condenser 4. Via line 12, gas comprising $CO_2$ from regenerator 10 enters ammonia recovery condenser 15. In ammonia recovery condenser 15, ammonia present in the gas is condensed. Condensed ammonia, typically dissolves in water which is condensed from water vapour present in gas leaving regenerator 10. Dissolved ammonia leaves ammonia recovery condenser 15 via line 16 and is returned to regenerator 10. $CO_2$ comprising gas depleted of ammonia leaves ammonia recovery condenser 15 via line 17.

The operating temperature of regenerator 10 is controlled by passing ammonia-comprising medium through a heat exchanger 18 and returning the medium to regenerator 10 via line 19. Heat exchanger 18 may be arranged on line 19, as illustrated in FIG. 2, or in a vessel comprising regenerator 10, similarly with the configuration of heat exchanger 8 in $CO_2$ absorber 1 in FIG. 1b.

As described above, in the system illustrated in FIG. 2, ammonia-comprising medium, including dissolved or solid carbonate or bicarbonate of ammonium, is fed from $CO_2$ absorber 1 to regenerator 10, whereas regenerated ammonia-comprising medium is fed from regenerator 10 to $CO_2$ absorber 1. The absorption process being exothermic and the regeneration process being endothermic, and said processes typically being operated at substantially different temperatures, means for heat recovery may improve the performance of the system. Thus, ammonia-comprising medium, including dissolved or solid carbonate or bicarbonate of ammonium, from $CO_2$ absorber 1 in line 11 is heat exchanged in an heat exchanger 20 with regenerated ammonia-comprising medium from regenerator 10 in lines 13 and 14.

Further means for temperature control of the system illustrated in FIG. 2 is represented by heat exchanger 21. Through heat exchanger 21, the medium in line 14 may be heated or cooled as desirable.

Example

A flue gas comprising 13% by volume $CO_2$ is contacted with an ammonia/ammonium-containing solution in an absorber at ambient temperature, such as at approximately 25° C. The pressure of the absorber is kept between 0 and 10 bar. A high pressure increases both the solubility of the carbon dioxide in the solvent and the residence time of the flue gas in the absorber, resulting in a smaller absorber size. A high pressure in the absorber decreases the partial pressure of the ammonia also. At the mentioned temperature the content of the $CO_2$ in the outgoing gas from absorber is expected to be below 2% by volume, meaning an overall $CO_2$ removal efficiency close to 85%. The removal efficiency can be improved by addition of promoters. Flue gas leaving the absorber passes an indirect cooler, reducing the gas temperature to a value between 0 and 5° C. Thereby, water present in the flue gas leaving the absorber is condensed. The ammonia present in the gas is dissolved in the condensed water. Condensed water comprising ammonia is returned from the indirect cooler to the absorber. The flue gas stream leaving the indirect cooler may contain some ammonia. Depending on the operational temperature this value can vary between tens and hundreds of ppm. A low pH wash system can be used to clean the flue gas from trace ammonia.

Absorption of $CO_2$ into ammonia/ammonium containing solution involves the following chemical reactions:

$$NH_3(a)+H_2O \rightleftharpoons NH_4^+ +OH^- \qquad 1$$

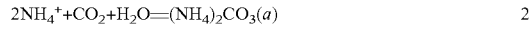

$$2NH_4^+ +CO_2+H_2O \rightleftharpoons (NH_4)_2CO_3(a) \qquad 2$$

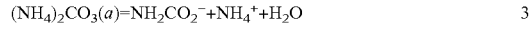

$$(NH_4)_2CO_3(a)=NH_2CO_2^- +NH_4^+ +H_2O \qquad 3$$

$$(NH_4)_2CO_3(a)+CO_2+H_2O=2NH_4HCO_3(a) \qquad 4$$

$$NH_4HCO_3(a)=NH_4HCO_3(s) \qquad 5$$

If $CO_2$ available is in excess, the solution in the absorber becomes saturated by ammonium bicarbonate. Further reaction of the solution with $CO_2$ results in precipitation of the ammonium bicarbonate. The longer the residence time of the solution in the absorber the higher becomes the fraction of the solid ammonium bicarbonate in the solution.

During regeneration $CO_2$ is recovered from the saturated ammonium bicarbonate solution. Regeneration is done at high pressure, preferably above 10 bar. Decomposition of solid ammonium bicarbonate starts at 30° C. at atmospheric pressure, resulting in formation of ammonia, $CO_2$ and water. Decomposition of the ammonium bicarbonate in slurry requires a higher temperature, due to the excess energy needed to increase the temperature of the solution. It is expected that the decomposition of the ammonium bicarbonate should result in an equi-molar formation of the ammonia, water and $CO_2$. Regeneration at high pressure causes that the water stays in liquid form. Due to its higher solubility the formed $NH_3$ dissolves in the water, whilst the $CO_2$ can leave the system in gas form. The temperature of the regeneration is dependant on the fraction of the solid ammonium bicarbonate in the solution. At solid contents above 50% by weight, the regeneration temperature can be close to 100° C., whereas a temperature of 130° C. could be required for solid contents close to 15% by weight.

The invention claimed is:

1. A method for removing $CO_2$ from a contaminated gas stream, the method comprising:

absorbing $CO_2$ from a gas stream using an ammonia comprising medium in a pressurized absorber to produce a gas stream depleted of $CO_2$ and an ammonia comprising medium with absorbed $CO_2$, the absorbing being performed at an elevated pressure sufficient to decrease the partial pressure the ammonia and increase the solubility of the $CO_2$ and at a temperature greater than 20° C.;

regenerating the ammonia comprising medium with absorbed $CO_2$ within a pressurized regenerator to separate $CO_2$ from the ammonia comprising medium, the regenerating being performed at a pressure greater than 10 bar gauge; and condensing ammonia present in the gas stream depleted of $CO_2$; and wherein the condensing is performed at a pressure between 0 bar gauge and 10 bar gauge.

2. The method of claim 1, wherein the absorbing is performed at a temperature between 20° C. and 80° C.

3. The method of claim 1, wherein the regenerating is performed at a temperature between 100° C. and 200° C.

4. A method for removing $CO_2$ from a contaminated gas stream, the method comprising:

absorbing $CO_2$ from a gas stream using an ammonia comprising medium in a pressurized absorber to produce a gas stream depleted of $CO_2$ and an ammonia comprising medium with absorbed $CO_2$, the absorbing being performed at a pressure sufficient to decrease the partial pressure the ammonia and increase the solubility of the $CO_2$;

regenerating the ammonia comprising medium with absorbed $CO_2$ within a pressurized regenerator to separate $CO_2$ from the ammonia comprising medium, the regenerating being performed at a pressure greater than 10 bar gauge; and condensing ammonia present in the gas stream depleted of $CO_2$ at a pressure between 0 bar gauge and 10 bar gauge.

5. The method of claim 4, wherein the condensing is performed at a temperature between 0° C. and 5° C.

6. The method of claim 1, wherein the ammonia comprising medium includes a carbonate or bicarbonate of ammonia in a solution or slurry.

7. The method of claim 1, further comprising:

returning ammonia condensed from the gas stream depleted of $CO_2$ to the absorber.

8. The method of claim 4, further comprising:

cooling the gas stream before the absorbing, and wherein the absorbing is performed at a temperature less than 16° C.

9. The method of claim 4, wherein the regenerating is performed at a temperature between 100° C. and 200° C.

10. A method for removing CO2 from a contaminated gas stream, the method comprising:

absorbing CO2 from a gas stream using an ammonia comprising medium in a pressurized absorber to produce a gas stream depleted of CO2 and an ammonia comprising medium with absorbed CO2, the absorbing being performed at an elevated pressure sufficient to decrease the partial pressure the ammonia and increase the solubility of the CO2 and at a temperature greater than 20° C.;

regenerating the ammonia comprising medium with absorbed CO2 within a pressurized regenerator to separate CO2 from the ammonia comprising medium, the regenerating being performed at a pressure greater than 10 bar gauge; and condensing ammonia present in the gas stream depleted of CO2; wherein the condensing is performed at a pressure between 0 bar gauge and 10 bar gauge; and wherein the condensing is performed at a temperature between 0° C. and 5° C.

11. The method of claim 10, wherein the ammonia comprising medium includes a carbonate or bicarbonate of ammonia in a solution or slurry.

12. The method of claim 10, further comprising:

returning ammonia condensed from the gas stream depleted of $CO_2$ to the absorber.

13. The method of claim 1, wherein the absorbing is performed at a pressure between 5 bar gauge and 10 bar gauge.

14. The method of claim 1, wherein the absorbing is performed at a temperature greater than 30° C.

15. The method of claim 4, wherein the absorbing is performed at a temperature greater than 30° C.

* * * * *